United States Patent
Selam

[11] 3,891,903
[45] June 24, 1975

[54] DEVICE FOR AUTOMATICALLY STARTING AND STOPPING AN ASYNCHRONOUS MOTOR

[76] Inventor: Gabriel Selam, 161 Boulevard Edouard Vaillant, 93 Aubervilliers, France

[22] Filed: Oct. 10, 1973

[21] Appl. No.: 405,109

[30] Foreign Application Priority Data
Oct. 10, 1972   France .......................... 72.35817

[52] U.S. Cl. ................ 318/212; 318/227; 318/229
[51] Int. Cl. ............................................ H02p 3/20
[58] Field of Search .......... 318/209, 211, 212, 227, 318/228, 229

[56] References Cited
UNITED STATES PATENTS

| | | | |
|---|---|---|---|
| 2,384,864 | 9/1945 | Wickerham | 318/229 X |
| 2,647,231 | 7/1953 | Cortelli | 318/229 |
| 2,665,404 | 1/1954 | Elliot | 318/228 R |
| 3,708,734 | 1/1973 | Rowe | 318/212 |
| 3,786,327 | 1/1974 | Dyer | 318/211 |

*Primary Examiner*—G. Z. Rubinson
*Attorney, Agent, or Firm*—Eric P. Schellin

[57] ABSTRACT

The device automatically starts and stops an asynchronous motor and comprises a variable impedance connected in series in at least one of the supply phases of the motor and means associated with said impedance for varying the value thereof with respect to time so as to produce a disequilibrium in the supply of the motor during its starting and stopping periods by a reduction in the voltage applied to said phase.

10 Claims, 5 Drawing Figures

DEVICE FOR AUTOMATICALLY STARTING AND STOPPING AN ASYNCHRONOUS MOTOR

The present invention concerns regulating devices for ensuring the automatic and progressive starting and stopping of asynchronous motors.

Many starting and stopping devices for asynchronous motors are known. They are usually devices operating by insertion of resistances in the phases, or by an autotransformer connected between the phases or by saturation of the armature.

These devices have several drawbacks in particular owing to the utilization of mechanically actuated switches or of the absorption of a large amount of energy when starting or stopping the motor.

An object of the present invention is to provide a starting and stopping device which operates entirely automatically while consuming little or no energy during the starting or stopping periods.

The invention provides an automatic starting and stopping device for an asynchronous motor, comprising a variable impedance connected in series in at least one of the supply phases of the motor and means associated with said impedance for varying the value thereof with respect to time so as to produce a disequilibrium in the supply of the motor during its starting and stopping periods by a reduction in the voltage applied to said phase.

According to a first embodiment of the invention, the variable impedance is a coil which is a part of an electromagnet comprising a plunger core capable of being energized by said coil in opposition to the action of resiliently yieldable means.

According to another embodiment of the invention, the variable impedance comprises the connection in parallel of a thyristor and a diode in opposition and the device further comprises a circuit controlling the thyristor and constituted by an RC circuit connected to a pulse generator.

Further features and advantages of the invention will be apparent from the ensuing description with reference to the accompanying drawings.

Figure 1:
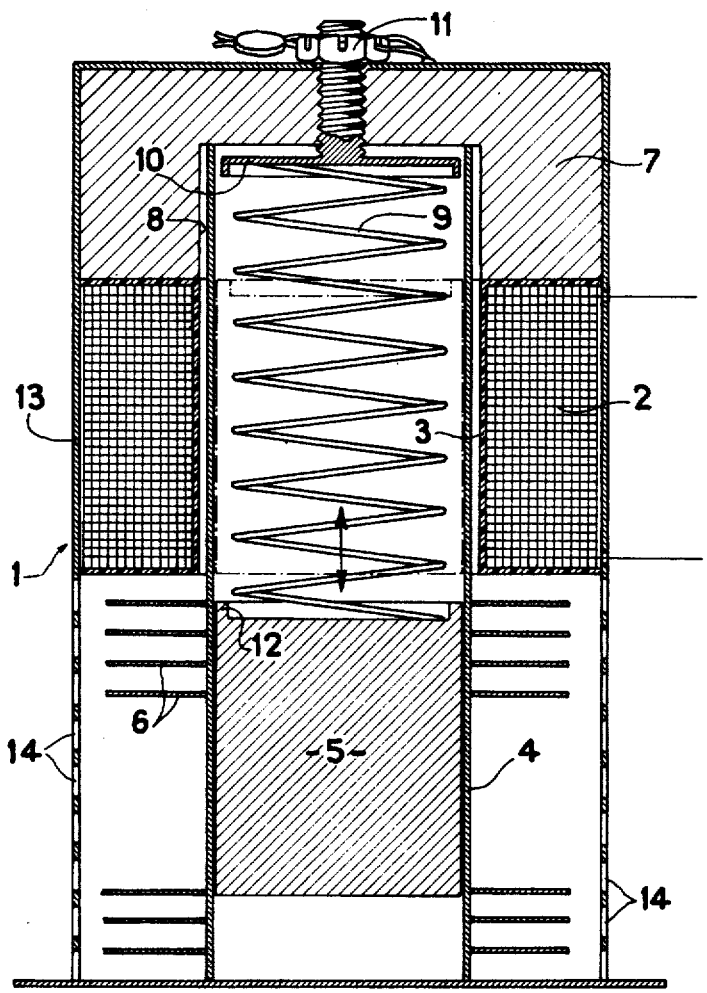
FIG. 1 is a sectional and elevational view of a device for starting and stopping an asynchronous motor in accordance with the invention.
Figure 2:
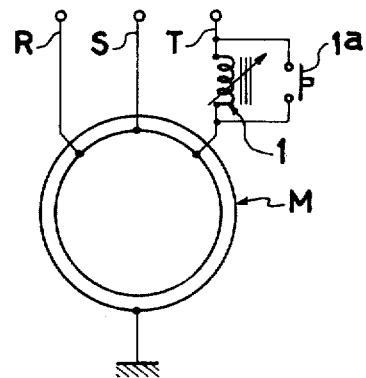
FIG. 2 is an electric diagram of this device and motor.

In the embodiment shown in FIGS. 1 and 2, the device according to the invention comprises a variable impedance 1 connected in series in one (T) of the phases R, S and T supplying an asynchronous motor M, for example of the cage type, from a suitable source of voltage such as the main supply.

FIG. 1 shows that the variable impedance 1 comprises a coil 2 wound around a mandrel 3 which is coaxially mounted on a cylindrical tube 4 acting as a guide for a plunger core 5.

The guide tube 4 is provided externally with cooling fins 6 adjacent one of its ends. The opposite end portion of the tube is surrounded by a block 7 of magnetic material which includes an axial cavity 8 in which is disposed the end of a spring 9. The latter bears at one end against a washer 10 in contact with a setting or calibrating screw 11 which is screwed in the block 7, and at the other end against the end of a recess defined by a circular rib 12 formed on the end of the core 5. The screw 11 permits adjusting the compression of the spring 9.

This assembly is disposed in a protective housing 13 provided with ventilating apertures 14.

The device operates in the following manner:

When the circuit of the motor M is cut off, the coil 2 is no longer supplied and the core 5 is in the illustrated position in which it is maintained by its own weight (if the device is placed in the upright position as shown) or by the force exerted by the spring 9.

At the moment of starting up the motor M, a very high current passes through the coil 2 the intensity of which corresponds to the starting current of the motor. The core 5 is attracted and assumes its upper position (FIG. 1), the travel being the greater as the starting current is higher. The travel depends moreover on the setting of the spring 9. When the core is introduced into the coil the impedance of the latter which was previously ohmic and very low becomes distinctly greater and this decreases the intensity of the current in the corresponding phase of the motor. In this way there is obtained a temporary disequilibrium in the supply of the motor, since the voltage of the phase concerned will be distinctly less. Once the starting up of the motor M has terminated, the coil 1 can be put in short-circuit, for example by means of a contact 1a.

The latter may be controlled either by the speed of the motor, this contact being then a centrifugal switch or a manually actuated relay contact, or in accordance with other suitable parameters.

During the stopping period, the 1la is once more opened so as to produce the hypersynchronous braking before the total stoppage of the motor M.

Note that the device just described may also serve to adjust the output torque of the motor M. Indeed, if the coil is not short-circuited during the normal operation of the motor, the torque of the latter will conserve a value which is lower than its nominal torque and this operating torque will depend on the impedance of the coil 1 and the position of the plunger 5 in the latter. As this position may be regulated by the setting of the spring 9, it is finally the compression of the spring which permits adjusting the operating torque of the motor M. Moreover, by inserting a block (not shown) of given size in the airgap of the coil 1, the travel of the plunger core may be stopped at a given value and this effect will be added to that produced by the spring 9.

Figure 3:
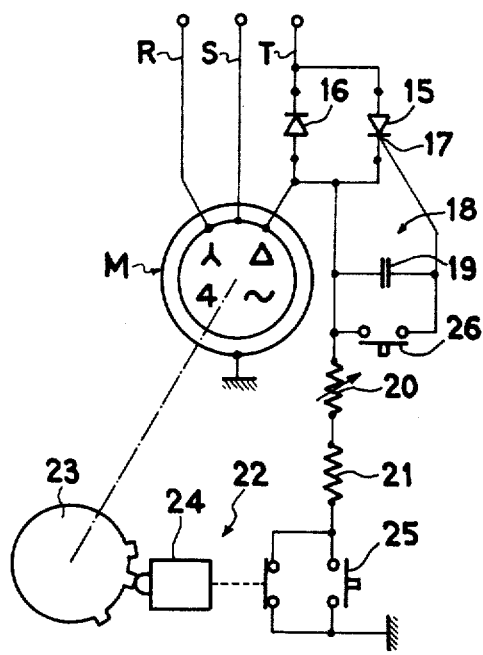
FIG. 3 is an electric diagram of a second embodiment of the device according to the invention.

In the embodiment shown in FIG. 3, the impedance of the device is constituted by a thyristor 15 connected in parallel to a diode 16 in opposition, the assembly being connected in series with one of the phases of the motor M. The latter is here also of the asynchronous cage type, for example. The control electrode 17 of the thyristor 15 is connected to an RC circuit 18 including in series a capacitor 19, an adjustable resistor 20 and a fixed resistor 21. This RC circuit 18 is connected to a pulse generator 22 which comprises, in this embodiment, a cam wheel 23 keyed to the shaft of the motor M and controlling a microswitch 24. The latter is connected between the resistor 21 and ground to which the neutral point of the motor M is also connected.

Two manually actuated contacts 25 and 26 are provided and respectively connected in parallel to the microswitch 24 and the capacitor 19. Note that the microswitch 24 and the cam wheel 23 may be replaced by any other suitable generator, such as a magnetic speed sensor.

The frequency of the pulses of the generator 22 is proportional to the speed of the motor M and their period T will diminish as the motor M gathers speed (time $T_o$) and will increase during the stopping period $T_a$ (curve A, FIG. 3).

Figure 5:
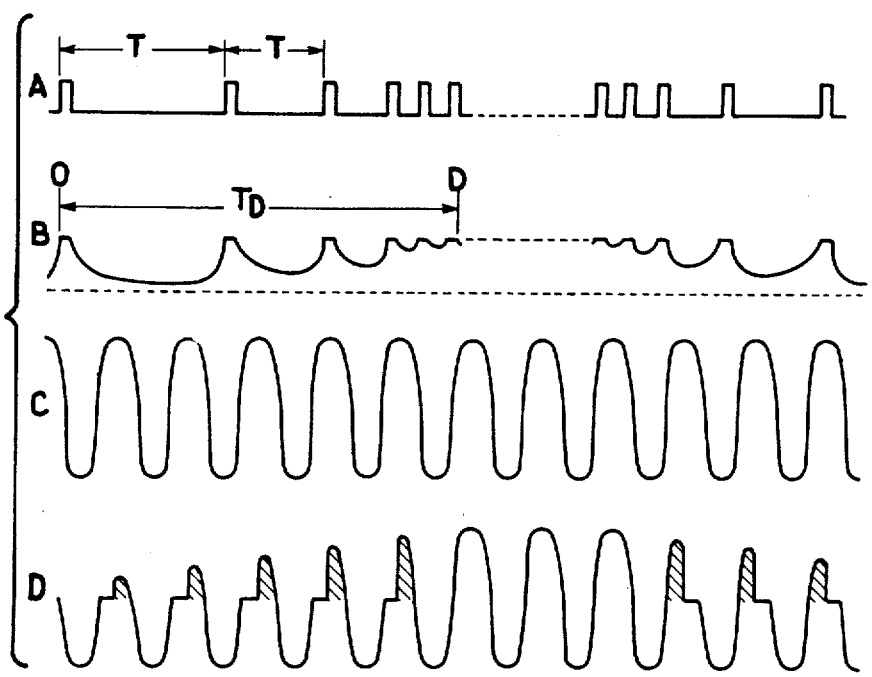
FIG. 5 is a diagram showing the curves of the signals appearing at various points of the circuit shown in FIG. 3.

When the motor is connected to the voltage, the form of the load of the capacitor 19 is as shown by the curve B in FIG. 3 and this load is employed for periodically triggering the thyristor 15. The sinusoidal current (curve C, FIG. 5) of the phase T in which the thyristor is inserted is thus converted into a rectified current having a half wave obtained by the diode 16 on which the other half wave is superimposed (curve D, FIG. 5). The power delivered by the motor M and its torque are directly related to the area of the cross-hatched areas shown under the curve D of FIG. 5.

During the starting up, this power increases progressively in accordance with the speed of the motor, which parameter is obtained in the pulse generator 22.

Inversely, at any given moment, the capacitor 19 may for example be short-circuited a few instants by means of the switch 26 or the pulse generator circuit 22 may be cut off by the switch 25 so as to produce a slowing down which corresponds to the inverse cycle of that which has just been described.

The duration of the starting and stopping periods is easily adjustable within very wide limits, for example by varying the number of cams of the wheel 23 which pass in front of the microswitch 24 or the width or the height of the pulses, without prejudice to the regulation of the values of the time constant of the integrator circuit, that is to say, the respective values of the resistor 21 and capacitor 19.

In certain cases it will be of utility to produce manually pulses by means of the switch 25 so as to initiate, prolong or shorten the starting period.

In the case of a motor having two speeds, it is possible, for example, to act on the value of the resistor 21 to obtain two successive starting cycles. One of the advantages of this device is that it may be applied to simple motors having a short-circuited rotor and to double cage or resistant cage motors while improving in all cases the typical starting curve of the motors.

This device may also be employed to achieve a progressive hypersynchronous braking.

If the motor is a motor of a hoisting apparatus, the initial maximum starting torque for overcoming the inertias is obtained during the necessary time by the simple fact of charging the capacitor 19 by means of a time switch contact (not shown) during a period of time, this contact being capable of short-circuiting the switch 25. After this short lapse of time, the motor may then start in accordance with the cycle described hereinbefore.

The auxiliary adjustable resistor 20 is available to the operator to intervene by a continuous regulation in the form of the starting or stopping cycle. Optionally, this resistor may be coupled to a dynamometer measuring the value of the load of the hoisting apparatus so as to adapt the starting and stopping cycles of this load.

Figure 4:
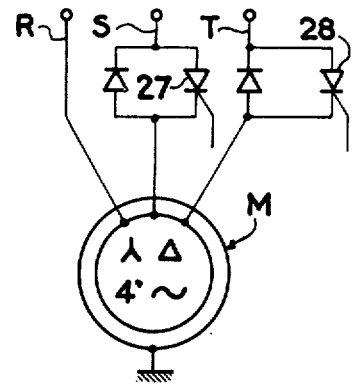
FIG. 4 is a diagram of a modification of the device shown in FIG. 3.

The modification shown in FIG. 4 shows that adjustable impedances 27 and 28 may be mounted in two phases S and T of the motor M. Each of the illustrated thyristors is then controlled by its own RC circuit and its own pulse generator.

Having now described my invention, what I claim as new and desire to secure by Letters Patent is:

1. A device for automatically starting and stopping an asynchronous motor having supply phases, said device comprising a variable impedance connected in series in at least one of the supply phases of the motor and means associated with said impedance and responsive to the speed of said motor for automatically decreasing the value thereof as the speed of said motor increases during its starting period and for automatically increasing the value of said impedance as the speed of said motor decreases during its stopping period so as to produce a disequilibrium in the supply of the motor by varying the voltage applied to said at least one phase.

2. A device as claimed in claim 1, wherein said variable impedance is constituted by the connection in parallel of a thyristor and a diode in opposition, the device further comprising an RC circuit connected to a control electrode of the thyristor, a pulse generator supplying the RC circuit.

3. A device as claimed in claim 2, wherein said RC circuit comprises at least one adjustable resistor.

4. A device as claimed in claim 2, wherein said pulse generator comprises a manual contact connected in series with the RC circuit.

5. A device as claimed in claim 2, wherein a manually actuated short-circuit switch is connected in parallel with the capacitor of said RC circuit.

6. A device as claimed in claim 2, comprising means responsive to the speed of the motor and associated with said impedance for regulating the value of said impedance in accordance with the speed of the motor, the means responsive to the speed of the motor comprising said pulse generator having a speed sensor of said motor.

7. A device for automatically starting and stopping an asynchronous motor having supply phases, said device comprising a variable impedance connected in series in at least one of the supply phases of the motor and means associated with said impedance for varying the value thereof with respect to time so as to produce a disequilibrium in the supply of the motor during its starting and stopping periods by a reduction in the voltage applied to said phase, said means comprising an electromagnet having a coil, a plunger core and resiliently yieldable return means, said coil being capable of shifting the core in opposition to the action of the return means when the electromagnet is energized and constituting said variable impedance.

8. A device as claimed in claim 2, comprising means responsive to the speed of the motor and associated with said impedance for regulating the value of said impedance in accordance with the speed of the motor.

9. A device as claimed in claim 8, wherein the means responsive to the speed of the motor comprise a short-circuit contact connected in parallel with the coil and centrifugal means connected to be driven by said motor for actuating the contact.

10. A device for automatically starting and stopping an asynchronous motor having supply phases, said device comprising a variable impedance connected in series in at least one of the supply phases of the motor and means associated with said impedance and responsive to the speed of said motor for automatically decreasing the value thereof as the speed of said motor increases during its starting period and for automatically increasing the value of said impedance as the speed of said motor decreases during its stopping period so as to produce a desequilibrium in the supply of the motor by varying the voltage applied to said at least one phase, said variable impedance being constituted by the connection in parallel of a thyristor and a diode in opposition, the device further comprising an RC circuit connected to a control electrode of the thyristor, means responsive to the speed of the motor and connected to said RC circuit for regulating the value of said impedance in accordance with the speed of the motor, the motor having an output shaft and said means responsive to the speed of the motor comprising a pulse generator having a cam wheel keyed to said output shaft and a microswitch capable of being actuated by the cam wheel, said pulse generator being connected to said RC circuit.

* * * * *